United States Patent [19]

Bloemen et al.

[11] Patent Number: 5,695,863
[45] Date of Patent: Dec. 9, 1997

[54] MAGNETO-OPTICAL RECORDING MEDIUM

[75] Inventors: Pascal J. H. Bloemen; Johannes B. F. Aan de Stegge; Pieter J. Van der Zaag; Ronald M. Wolf, all of Eindhoven, Netherlands

[73] Assignee: U.S. Philips Corporation, New York, N.Y.

[21] Appl. No.: 488,539

[22] Filed: Jun. 7, 1995

[30] Foreign Application Priority Data

Jun. 9, 1994 [EP] European Pat. Off. ............ 94201646

[51] Int. Cl.$^6$ .................................................. G11B 5/66
[52] U.S. Cl. .............. 428/212; 428/336; 428/694 ML; 428/694 SC; 428/794 T; 428/694 TS; 428/900; 369/13
[58] Field of Search ............. 428/694 ML, 694 SC, 428/694 GT, 694 XS, 694 T, 694 TS, 694 TM, 336, 212, 694 MM, 900; 369/13

[56] References Cited

U.S. PATENT DOCUMENTS

| | | | |
|---|---|---|---|
| 4,544,602 | 10/1985 | Kobayashi et al. | 428/336 |
| 4,586,092 | 4/1986 | Martens et al. | 360/59 |
| 4,690,861 | 9/1987 | Nakamura et al. | 428/694 |
| 4,726,988 | 2/1988 | Oka et al. | 428/307.3 |
| 4,775,576 | 10/1988 | Bouchard et al. | 428/216 |
| 4,975,324 | 12/1990 | Torii et al. | 428/329 |
| 5,326,637 | 7/1994 | Nasu et al. | 428/336 |
| 5,378,548 | 1/1995 | Torii et al. | 428/694 TS |
| 5,391,431 | 2/1995 | Kudoh et al. | 428/336 |

OTHER PUBLICATIONS

Fujii et al in "Ferrites: Proceedings of The Sixth International Conference Ferrites (ICF 6), Tokyo and Kyoto, Japan 1992", published by the Japan Soc. of Powder and Powder Metallurgy, pp. 468–471 (1992).

Hoshi et al., IEEE Trans. Magn. MAG–23 (5), pp. 2251–2253 (1987).

*Primary Examiner*—Stevan A. Resan
*Attorney, Agent, or Firm*—Norman N. Spain

[57] ABSTRACT

A magneto-optical recording medium comprising a substrate and a recording layer, the recording layer comprising a bilayer structure consisting of a first layer on which a magnetic second layer is deposited, the second layer demonstrating perpendicular magnetic anisotropy and a saturation remanence of at least 90%, whereby the magnetic material of the second layer comprises an oxide of iron, and the first layer comprises an oxidic material whose in-plane lattice parameter differs from that of the magnetic material, the growth of the second layer upon the first layer being at least locally epitaxial.

20 Claims, 1 Drawing Sheet

MAGNETO-OPTICAL RECORDING MEDIUM

BACKGROUND OF THE INVENTION

The invention relates to a magneto-optical recording medium comprising a substrate and a recording layer, the recording layer comprising a bilayer structure consisting of a first layer on which a magnetic second layer is deposited, the second layer demonstrating perpendicular magnetic anisotropy and a saturation remanence of at least 90%.

In a magneto-optical recording medium, binary data bits can be individually represented by domains which are magnetized in one of two different orientations. Such data bits can be read via magneto-optical effects, based upon the fact that the polarization state of light incident on a given domain (e.g. from a laser) is characteristically changed in accordance with the direction and magnitude of the magnetization in that domain. Such changes in polarization state can be monitored in the light reflected from the domain (Kerr effect) or in the light transmitted through the domain (Faraday effect).

The desired magnetised domains can be obtained using a procedure referred to as thermomagnetic writing, in which a focused light beam is used to locally heat the recording layer to a temperature near its Curie temperature. When the domain thus heated is allowed to cool in an external magnetic field, its magnetization will align and lodge itself in the direction of that field.

The magneto-optical recording medium is typically embodied as, for example, a tape, card or disc. In one particular embodiment, the medium takes the form of a thin disc (single-sided or double-sided) which can be rotated about its circular axis and simultaneously radially scanned with a focused laser beam. Successive data bit domains on the disc are usually arranged along a so-called servo track (generally spiral in form), which can be employed to guide the scanning laser beam.

Perpendicular magnetic anisotropy (PMA) is a highly desirable characteristic of a recording medium, since it allows higher data storage densities than media with in-plane anisotropy. In addition, recording media demonstrating PMA can advantageously be read using the so-called polar magneto-optical effect, whereby the employed irradiating light beam is directed substantially parallel to the medium's magnetization direction (i.e. perpendicular to the plane of the medium). For a given material, the polar Kerr rotation $\theta_k$ and polar Kerr ellipticity $\epsilon_k$ (being two different aspects of the polar Kerr effect $\alpha_k$) are substantially larger than their so-called longitudinal and transverse counterparts (both of which involve irradiation substantially at right angles to the magnetization direction, i.e. at glancing angles with the plane of the medium).

The term "saturation remanence" ($R_s$) as here employed refers to the ratio of the exhibited magnetization at zero external field ($M_o$) to the exhibited magnetization at saturating external field ($M_s$), whereby $M_s$ is first measured under the influence of a relatively strong external magnetic field, which is then reduced continuously to zero before measuring $M_o$. Instead of directly measuring the ratio $R_s = M_o M_s$, one can instead measure the equivalent ratios $(\theta_k)_o/(\theta_k)_s$ or $(\epsilon_k)_o/(\epsilon_k)_s$, since both $\theta_k$ and $\epsilon_k$ are proportional to the magnetization M.

A high value of $R_s$ is crucial to the stability and reproducibility of the recording process in a magneto-optical medium. In general, it is preferable to secure a value for $R_s$ which is as close as possible to 100%.

More information with regard to the role of these parameters in magneto-optical recording can be gleaned from the article by Zeper et al. in J. Appl. Phys. 70 (4), pp 2264–2271 (1991).

A magneto-optical recording medium as described in the opening paragraph is known from European Patent Specification EP-B 304 873, in which the recording layer actually contains a plurality of adjacent, identical bilayer structures. In each such bilayer structure, the first layer comprises a non-magnetic metal selected from the group formed by Pt and Pd, whereas the second layer is comprised of magnetic Co metal. When sufficiently thin (typically 0.2–0.5 nm thick), each constituent Co layer demonstrates perpendicular magnetic anisotropy. However, the constituent Co layers of the bilayer structure are quite sensitive to oxidation, which can cause considerable alteration of their magnetic properties with time, and necessitates protection of the recording layer with supplementary anti-corrosion layers.

Another known magneto-optical recording medium is elucidated in United Kingdom Patent Application GB-A 2 077 065, in which the constituent first and second layers of the recording bilayer comprise (different) magnetic amorphous alloys of rare earth (RE) and transition metal (TM) elements. Commonly occurring alloys in this category include GdTbFe and TbFeCo, for example. Whereas these media demonstrate perpendicular magnetic anisotropy in combination with other acceptable magnetic properties, they are very sensitive to oxidation and corrosion, and their recording characteristics are critically dependent on the exact alloy composition employed. This not only necessitates the inclusion of protective anti-oxidation layers in the media, but also places stringent demands on the accuracy of the manufacturing processes by which such media are produced.

SUMMARY OF THE INVENTION

It is an object of the invention to provide an alternative magneto-optical recording medium invention to provide such a medium which shows reduced sensitivity to oxidation to those already known in the art.

According to the invention, these and other objects are achieved in a magneto-optical recording medium as specified in the opening paragraph, characterized in that the magnetic material of the second layer comprises an oxide of iron, and that the first layer comprises an oxidic material whose in-plane lattice parameter differs from that of the magnetic material, the growth of the second layer upon the first layer being at least locally epitaxial.

The occurrence of perpendicular magnetic anisotropy in combination with a high saturation remanence ($R_s \geq 90\%$) is an unexpected and highly significant phenomenon for an iron oxide layer, which would normally be expected to demonstrate strong in-plane magnetization. The inventors attribute the phenomenon to magnetostriction effects, resulting from the discrepant in-plane lattice parameters of the first and second layers. Local epitaxial growth of the second layer upon the first layer demands an in-plane deformation of the second layer's crystal lattice, in order to maintain in-plane registry with the different surface net of the first layer. This deformation, and its associated magnetization effect, force the magnetization in the second layer to abandon its normal in-plane orientation and instead adopt an orientation substantially perpendicular to the layer.

Supplementary information with regard to the phenomenon of magnetostriction in general is given by S. Chikazumi in "Physics of Magnetism", ISBN 0-88275-662-1, R.

E. Krieger Publ. Co., Malabar, Fla. (1978), in particular Chapter 8, pp 161–185.

The statement that the growth of the second layer upon the first layer is "at least locally epitaxial" should be interpreted as encompassing the following possible and acceptable scenarios:

Uniform, continuous epitaxial growth of the second layer over a substantial area of the first layer. In practice, this is only feasible when the first layer is monocrystalline;

Local epitaxial growth of the material of the second layer upon a multitude of individual "grains" in the first layer, the majority of these grains assuming a common crystallographic orientation normal to the plane of the layer. In practice, this scenario can be expected when a polycrystalline or amorphous substrate is employed.

In the first case, a magnetostriction effect occurs more-or-less uniformly throughout the second layer, whereas, in the second case, magnetostriction occurs in a plurality of small mutually-isolated regions within the (textured) magnetic material.

In accordance with the invention, the second layer in the recording bilayer can, in principle, comprise a wide range of magnetic materials. These not only include pure iron oxides (such as $Fe_3O_4$), but also, for example spinel ferrites, garnets and perovskites.

Since the component materials of the inventive recording bilayer are already oxidic, it follows naturally that such a medium will be largely insensitive to further oxidation. In addition, the Fe content of the magnetic second layer advantageously endows the medium with a magneto-optical Kerr effect of satisfactory magnitude.

It should be noted that a number of existing publications discuss out-of-plane magnetic anisotropy in specific ferrite layers, grown under various circumstances. See, for example:

Fujii et al. in "Ferrites: Proceedings of The Sixth International Conference on Ferrites (ICF 6), Tokyo and Kyoto, Japan 1992", published by the Japan Society of Powder and Powder Metallurgy, pp 468–471 (1992);

Hoshi et al., IEEE Trans. Magn. MAG-23 (5), pp 2251–2253 (1987).

However, in these instances, the presented hysteresis loops, coercivity measurements, etc., make it evident that the ferrite layers concerned either do not demonstrate true perpendicular magnetic anisotropy, or do not exhibit satisfactory saturation remanence (i.e. $R_s \geq 90\%$). In addition, these publications do not report favorable magneto-optical properties for their subject media.

A preferential embodiment of the magneto-optical recording medium according to the present invention is characterized in that the second layer is predominantly comprised of $Fe_3O_4$ (also called "magnetite"). The expression "predominantly comprised" should here be interpreted as indicating that the second layer consists of at least 95 wt. % $Fe_3O_4$, whereby the remaining 5 wt. % may also be comprised of $Fe_3O_4$, or of at least one intentional additive, or of foreign material present as an impurity. An advantage of having the second layer has such a majority $Fe_3O_4$-content is that magnetite have a relatively elastic crystal lattice, which facilitates its epitaxial growth on an underlayer having a discrepant surface net. $Fe_3O_4$ is also relatively easy to deposit, e.g. by sputtering, evaporating or ablating an iron target in an oxygen atmosphere, or by means of a Chemical Vapour Deposition (CVD) technique. Intentional additives may easily be incorporated in such a layer by using, for example, an iron alloy target, or by co-deposition from separate targets (one of iron and one of the required additive); in this way, it is possible to manufacture the second layer from, for example, a cobalt ferrite material.

An important advantage of the inventive medium is that, since both constituent layers of the recording bilayer comprise an oxide, they can both be provided using a single deposition technique. For example, both layers can be created using sputter deposition in an oxygen atmosphere, without the need to transfer the substrate from one apparatus to another between provision of the first and second layer. This helps prevent unwanted contamination of the recording layer, and also saves time and effort.

DETAILED DESCRIPTION OF THE INVENTION

Figure 1:
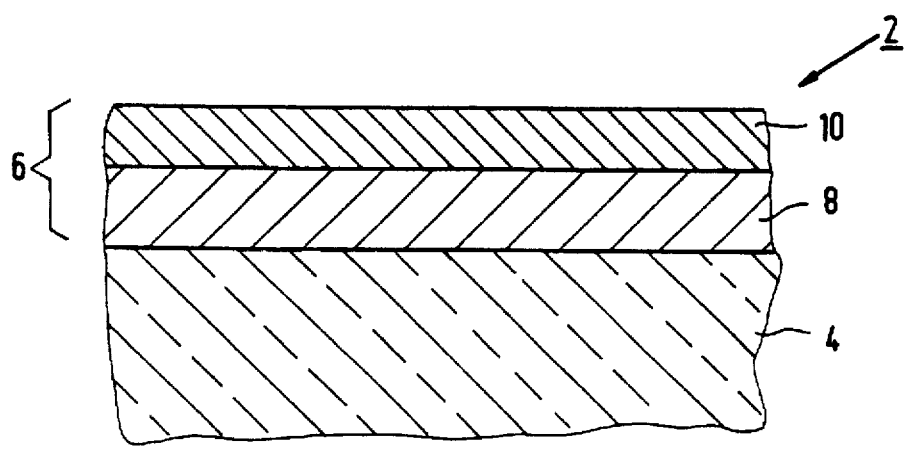
FIG. 1 is a cross-section view of part of an embodiment a magneto-optical recording medium in accordance with the invention.

A preferential embodiment of the inventive magneto-optical recording medium is characterized in that the oxidic material of the first layer has an essentially square surface net. The term "surface net" which is conventionally used in the crystallographic field to refer to the 2-dimensional form of a crystal lattice when viewed perpendicular to a crystal plane and in which the exposed atoms within a cleaved plane of the lattice shows a repetitive 2-dimensional pattern analogous to the repetitive structure of a fishing net. The term "essentially square" should here be interpreted as referring to the surface nets of such crystal structures such as rocksalt, face-centered cubic (fcc), body-centered cubic (bcc) and tetragonal, spinel. Since $Fe_3O_4$ has a spinel crystal structure, with cubically arranged oxygen atoms, its epitaxial growth on an oxidic underlayer is facilitated if the oxygen atoms of that underlayer also display a cubic surface net. Similar arguments apply to overlayers comprising other iron oxides such as spinel ferrites, etc. Epitaxial growth is, of course, still possible on compatible underlayers having a non-cubic surface net.

The in-plane lattice parameter of the first layer may be larger or smaller than that of the second layer (either such instance representing the required in-plane lattice discrepancy). The final choice of oxidic material for the first layer, and thus the choice of a larger or smaller in-plane lattice parameter than that of the second layer, will be determined inter alia by the desired (or required) crystallographic orientation of the magnetic material of the second layer, since magnetostriction effects are generally orientation-dependent. For example, a (100) $Fe_3O_4$ layer must undergo in-plane expansion in order to endow it with magnetostrictive PMA; for this reason, such a layer should be deposited on an underlayer material whose in-plane lattice parameter is larger than its own (such as CoO). On the other hand, magnetostrictive PMA in a (111) $Fe_3O_4$ layer requires in-plane contraction, so that such a layer should be grown on an underlayer material whose in-plane lattice parameter is smaller than that of its own. In this particular case, it should also be noted that the magnitude of the magnetostriction effect in (100) $Fe_3O_4$ is significantly greater than that in (111) $Fe_3O_4$.

A particularly advantageous embodiment of the magneto-optical recording medium according to the invention is characterized in that the first layer comprises CoO. Relative to $Fe_3O_4$, for example, CoO has an in-plane lattice parameter and bulk elasticity which facilitate strong in-plane deformation (i.e. forced epitaxy) of an overlayer deposited thereon. In addition, CoO is paramagnetic at room temperature, so that it does not itself interfere with the magnetic properties of an overlying magnetic layer.

A further preferential embodiment of the inventive magneto-optical recording medium is characterized in that the thickness $t_1$ of the first layer is at least 10 nm. If $t_1$ is too small with respect to the thickness $t_2$ of the second layer, then there may be insufficient material in the first layer to force a sizeable in-plane lattice deformation in the second layer. For example, in the case of a 10-nm layer of $Fe_3O_4$ deposited on a CoO underlayer, the $Fe_3O_4$ layer generally will not demonstrate perpendicular magnetic anisotropy and $R_s \approx 100\%$ unless the CoO layer is at least 11–12 nm thick.

The substrate preferably comprises a material which can be provided with a smooth, optically-flat surface, on which preferential growth of the oxidic first layer in the desired crystallographic orientation can occur. In addition, the substrate material is preferably transparent at the intended reading/writing wavelength, since data-exchange with the medium can then advantageously occur via the substrate, if so desired. Examples of a suitable substrate materials include, for example, glass, quartz, polyimide and various oxidic materials (such as MgO, and other metal oxides).

The Curie temperature ($T_c$) of the inventive magneto-optical recording medium will depend on the particular choice of material in the magnetic second layer, and can be modified by the incorporation of suitably chosen additives therein. For example, the Curie temperature of pure $Fe_3O_4$ is approximately 585° C., whereas that of $ZnFe_2O_4$ is about −264° C.; it is therefore clear that incorporation of a small quantity of, for example, Zn in an otherwise pure $Fe_3O_4$ magnetic layer can allow controlled reduction of $T_c$ for the material of that layer. Other candidate additives for this purpose include, for example, Mn. In this way, the invention allows achievement of a magneto-optical recording medium for which the value of $T_c$ is well matched to the power output of typical compact semiconductor lasers (i.e. $T_c \sim 150°–200°$ C.).

Similar considerations apply to the value of the medium's coercive field ($H_c$), which also depends on the material composition of the magnetic second layer, and can also be modified by addition of suitable substances to its basic constituent material. For example, the incorporation of small quantities of Co in an $Fe_3O_4$ layer can cause a substantial increase in that layer's coercive field.

In addition to the substrate and the first and second layers hereabove discussed, the magneto-optical recording medium according to the invention can, of course, comprise various additional layers. For example, the recording layer may in fact comprise a plurality of the bilayer structures already described, or just a single supplementary oxidic or magnetic layer. In addition, various other layers may be included in the medium, such as:

A photo-polymerized layer of, for example, a UV-cured photolacquer. Such a layer can, for example, be deposited directly on the substrate, and can be provided during curing with a servo track (guide groove) along which individual data bits can be written. In the case of a substrate manufactured from a synthetic resin, a servo track can be provided directly in the substrate itself;

A dielectric enhancement layer of a material such as AlN or $Si_3N_4$. Such a layer can serve to artificially enhance the Kerr effect of the recording layer;

A reflector layer of a highly reflective metal such as Au, Ag, Al or Cu. The presence of such a layer can improve the overall reflectivity of the recording medium with respect to the light beam employed to read data bits therefrom;

A protective layer of, for example, a spin-coated UV-cured photolacquer.

It is, of course, obvious that the inventive magneto-optical recording medium heretofore elucidated can also be employed as a magnetic recording medium. In such an instance, the magnetic data stored on the medium can be read therefrom using a magnetic field sensor, such as a magnetic head. Alternatively, data can be read from the medium using so-called near-field microscopy techniques.

The invention and its attendant advantages will be further elucidated with the aid of exemplary embodiments and the accompanying figures of the drawing.

Embodiment 1

FIG. 1 is a cross-sectional view of part of a magneto-optical recording medium 2 in accordance with the invention. The medium 2 comprises a substrate 4 which is provided with a recording layer 6. The recording layer 6 in turn comprises a bilayer structure which consists of an oxidic first layer 8 and a magnetic second layer 10, the growth of the layer 10 on the layer 8 having been at least locally epitaxial. The in-plane lattice parameter of the layer 8 (i.e. the lattice parameter of the layer 8 measured within the plane of that layer) is larger than that of the layer 10.

In this particular embodiment, the substrate 4 was comprised of MgO, the layer 8 comprised CoO, and the layer 10 was comprised of $Fe_3O_4$, all of which demonstrated a (100) crystallographic orientation. The layers 8 and 10 had respective thicknesses of 12 and 10 nm.

Deposition of the layers 8, 10 was conducted in a differentially-pumped Molecular Beam Epitaxy (MBE) chamber by means of reactive evaporation from targets of Co (in the case of layer 8) and Fe (in the case of layer 10). The deposition rate was approximately 0.06 nm s$^{-1}$ (in both cases), and the temperature of the MgO substrate during layer growth was maintained at approximately 302° C. During evaporation, oxygen gas was admitted to the MBE chamber via a doser located close to the MgO substrate, up to a pressure of approximately $2 \times 10^{-5}$ Torr. This oxygen pressure was maintained during post-deposition cooling of the substrate.

Subsequent to its manufacture, the medium 2 was subjected to Auger Electron Spectroscopy (AES), from which it transpired that the layer 10 additionally contained approximately 0.5 at. % Co, present as an impurity.

Figure 2:
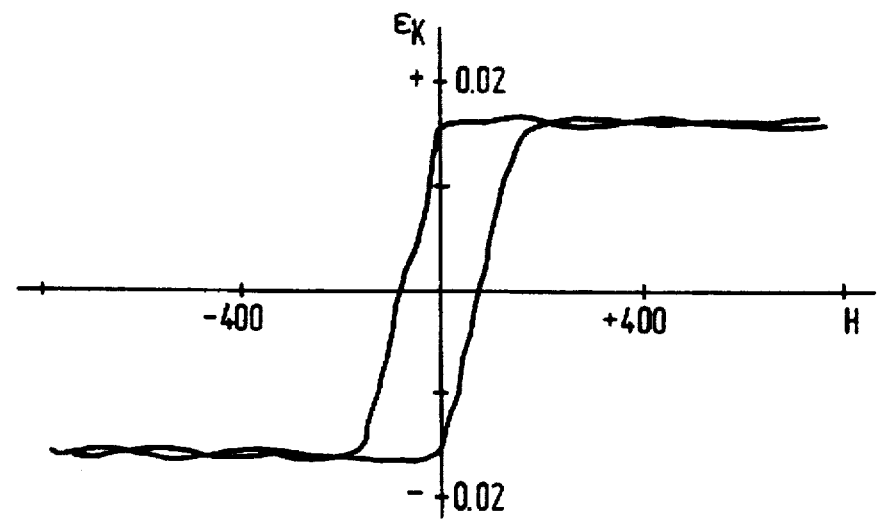
FIG. 2 is a graph showing a magnetic hystersis loop of the embodiment of FIG. 1.

FIG. 2 depicts a magnetic hysteresis loop pertaining to the inventive medium 2. The loop is a graph of polar magneto-optical Kerr ellipticity $\epsilon_k$ (in degrees) as a function of external polar magnetic field H (in kA/m), whereby the medium 2 was irradiated via the layer 10 using a HeNe gas laser of wavelength 633 nm. It is immediately evident from the loop that $R_s \sim 100\%$, and that the magnetic anisotropy is perpendicular to the plane of the medium (since there is a considerable Kerr effect at zero field in polar geometry).

Embodiment 2

Figure 3:
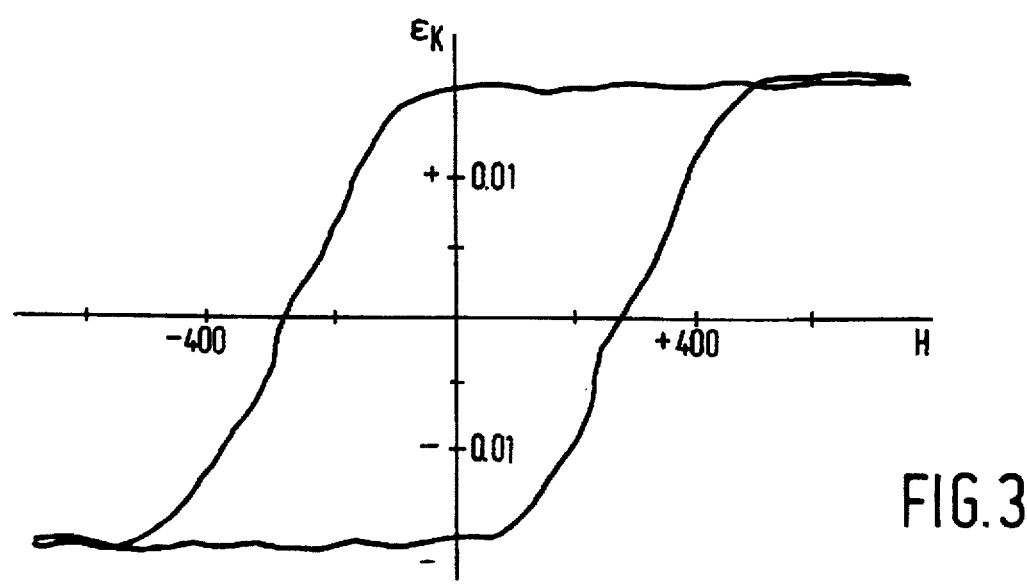
FIG. 3 is a graph showing a magnetic hystersis loop of another embodiment of the recording medium of the invention.

FIG. 3 shows a polar magnetic hysteresis loop pertaining to another embodiment of the inventive magneto-optical recording medium. Once again, the loop is a graph of polar magneto-optical Kerr ellipticity $\epsilon_k$ (in degrees) as a function of external polar magnetic field H (in kA/m), whereby the medium was irradiated via its magnetic second layer using a HeNe gas laser of wavelength 633 nm.

In this particular embodiment, which was similar in its build-up to the subject of FIG. 1, the substrate material was MgO, the oxidic material of the first layer was CoO, and the magnetic material of the second layer was $Co_xFe_{3-x}O_4$, x≈0.2, all of these materials demonstrating a (100) crystallographic orientation. The thickness of the CoO layer was about 30 nm, whereas that of the magnetic second layer was approximately 40 nm.

Deposition was conducted in the same manner as hereabove described in Embodiment 1, except that the magnetic $Co_xFe_{3-x}O_4$ layer was deposited by simultaneous evaporation from separate Fe and Co sources, the deposition rate from the Fe source being approximately 0.095 nm s$^{-1}$ and that from the Co source being about 0.0085 nm s$^{-1}$.

Once again, it is evident from the hysteresis loop that $R_s$≈100%, and that the magnetic anisotropy is perpendicular to the plane of the medium.

We claim:

1. A magneto-optical recording medium comprising a substrate and a recording layer, the recording layer comprising a bilayer structure consisting of a non-magnetic first layer provided on said substrate on which first layer a magnetic second layer is deposited, the second layer exhibiting perpendicular magnetic anisotropy and a saturation remanence of at least 90%, characterized in that the magnetic material of the second layer comprises an oxide of iron, and that the first layer comprises an oxidic material whose in-plane lattice parameter differs from that of the magnetic material, the growth of the second layer upon the first layer being at least locally epitaxial.

2. A magneto-optical recording medium according to claim 1, characterized in that at least 95 wt % of the second layer consists of $Fe_3O_4$.

3. A magneto-optical recording medium according to claim 1 or 2, characterized in that the oxidic material of the first layer has an essentially square surface net.

4. A magneto-optical recording medium according to claim 1, characterized in that the thickness $t_1$ of the first layer is at least 10 nm.

5. A magneto-optical recording medium according to claim 1, characterized in that the in-plane lattice parameter of the oxidic material of the first layer is larger than that of the magnetic material of the second layer, and that this second layer has a predominantly (100) crystallographic orientation.

6. A magneto-optical recording medium according to claim 5, characterized in that the first layer comprises CoO.

7. A magneto-optical recording medium according to claim 4, characterized in that the in-plane lattice parameter of the oxidic material of the first layer is smaller than that of the magnetic material of the second layer, and that this second layer demonstrates a predominantly (111) crystallographic orientation.

8. A magneto-optical recording medium according to claim 1, characterized in that the magnetic material of the second layer comprises at least one element selected from the group consisting of Zn, Mn, and Co.

9. A magneto-optical recording medium according to claim 2, characterized in that the thickness $t_1$ of the first layer is at least 10 nm.

10. A magneto-optical recording medium according to claim 3, characterized in that the thickness $t_1$ of the first layer is at least 10 nm.

11. A magneto-optical recording medium according to claim 2, characterized in that the in-plane lattice parameter of the oxidic material of the first layer is larger than that of the magnetic material of the second layer, and that this second layer has a predominantly (100) crystallographic orientation.

12. A magneto-optical recording medium according to claim 3, characterized in that the in-plane lattice parameter of the oxidic material of the first layer is larger than that of the magnetic material of the second layer, and that this second layer has a predominantly (100) crystallographic orientation.

13. A magneto-optical recording medium according to claim 4, characterized in that the in-plane lattice parameter of the oxidic material of the first layer is larger than that of the magnetic material of the second layer, and that this second layer demonstrates a predominantly (100) crystallographic orientation.

14. A magneto-optical recording medium according to claim 2, characterized in that the in-plane lattice parameter of the oxidic material of the first layer is smaller than that of the magnetic material of the second layer, and that this second layer has a predominantly (111) crystallographic orientation.

15. A magneto-optical recording medium according to claim 3, characterized in that the in-plane lattice parameter of the oxidic material of the first layer is smaller than that of the magnetic material of the second layer, and that this second layer has a predominantly (111) crystallographic orientation.

16. A magneto-optical recording medium according to claim 4, characterized in that the in-plane lattice parameter of the oxidic material of the first layer is smaller than that of the magnetic material of the second layer, and that this second layer has a predominantly (111) crystallographic orientation.

17. A magneto-optical recording medium according to claim 2, characterized in that the magnetic material of the second layer comprises in addition at least one element selected from the group consisting of by Zn, Mn, and Co.

18. A magneto-optical recording medium according to claim 3, characterized in that the magnetic material of the second layer comprises in addition at least one element selected from the group consisting of by Zn, Mn, and Co.

19. A magneto-optical recording medium according to claim 4, characterized in that the magnetic material of the second layer comprises in addition at least one element selected from the group consisting of by Zn, Mn, and Co.

20. A magneto-optical recording medium according to claim 5, characterized in that the magnetic material of the second layer comprises in addition at least one element selected from the group consisting of by Zn, Mn, and Co.

* * * * *